US007712037B2

(12) United States Patent
Conrad et al.

(10) Patent No.: US 7,712,037 B2
(45) Date of Patent: *May 4, 2010

(54) COMPUTER SYSTEM WITH GRAPHICAL USER INTERFACE INCLUDING SPRING-LOADED ENCLOSURES

(75) Inventors: Thomas J. Conrad, San Jose, CA (US); Yin Yin Wong, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 11/648,053

(22) Filed: Dec. 28, 2006

(65) Prior Publication Data

US 2007/0113197 A1 May 17, 2007

Related U.S. Application Data

(63) Continuation of application No. 11/187,078, filed on Jul. 21, 2005, now Pat. No. 7,549,126, which is a continuation of application No. 09/964,723, filed on Sep. 25, 2001, now Pat. No. 6,928,621, which is a continuation of application No. 09/565,912, filed on May 5, 2000, now Pat. No. 6,307,545, which is a continuation of application No. 08/889,719, filed on Jul. 8, 1997, now Pat. No. 6,061,061, which is a continuation of application No. 08/482,186, filed on Jun. 7, 1995, now Pat. No. 5,680,562, which is a continuation of application No. 08/076,253, filed on Jun. 11, 1993, now Pat. No. 5,583,984.

(51) Int. Cl.
*G06F 3/048* (2006.01)
(52) U.S. Cl. .................. 715/769; 715/781; 715/835
(58) Field of Classification Search .................. 715/769, 715/781, 839
See application file for complete search history.

(56) References Cited

U.S. PATENT DOCUMENTS 4,464,652 A    8/1984    Lapson et al.

(Continued)

FOREIGN PATENT DOCUMENTS

EP    0 483 777    5/1992

(Continued)

OTHER PUBLICATIONS

Johnston, R., "Window Shade Version 1.1 Program", Interactive Technologies, Inc., Stuart, Florida, 1989, 2 pages.

(Continued)

*Primary Examiner*—Boris Pesin
(74) *Attorney, Agent, or Firm*—Blakely, Sokoloff, Taylor & Zafman LLP

(57) ABSTRACT

A new behavior in a graphical user interface allows the user to open and close enclosures, while dragging an object. When the user pauses, gestures, or rolls over a hot spot on top of an icon or text representing a closed enclosure, a temporary window for the closed enclosure is "sprung open" to allow the user to browse inside the enclosure and possible open another enclosure contained within the temporary window. This process can be carried on throughout a hierarchy of windows as the user browses for a destination window for the drag operation. All of the temporary windows except the destination are closed when the mouse button is released, signaling the end of a drag. The user may close sprung open windows by simply moving the cursor out of the sprung open window, or by making some other gesture. If an enclosure to be sprung open was previously open on the desktop, the previously opened window may zoom over to the current mouse position, and then return to its original position when the user mouse is out of the window.

36 Claims, 15 Drawing Sheets

U.S. PATENT DOCUMENTS

| | | | |
|---|---|---|---|
| 4,555,775 | A | 11/1985 | Pike |
| 4,653,020 | A | 3/1987 | Cheselka et al. |
| 4,688,167 | A | 8/1987 | Agarwal |
| 4,689,737 | A | 8/1987 | Grant |
| 4,712,191 | A | 12/1987 | Penna |
| 4,769,636 | A | 9/1988 | Iwami et al. |
| 4,780,709 | A | 10/1988 | Randall |
| 4,783,648 | A | 11/1988 | Homma et al. |
| 4,819,189 | A | 4/1989 | Kikuchi et al. |
| 4,831,556 | A | 5/1989 | Oono |
| 4,862,389 | A | 8/1989 | Takagi |
| 4,899,136 | A | 2/1990 | Beard et al. |
| 5,008,853 | A | 4/1991 | Bly et al. |
| 5,040,131 | A | 8/1991 | Torres |
| 5,060,170 | A | 10/1991 | Bourgeois et al. |
| 5,107,443 | A | 4/1992 | Smith et al. |
| 5,140,677 | A | 8/1992 | Fleming et al. |
| 5,140,678 | A | 8/1992 | Torres |
| 5,146,556 | A | 9/1992 | Hullot et al. |
| 5,202,828 | A | 4/1993 | Vertelney et al. |
| 5,293,476 | A | 3/1994 | Wolber et al. |
| 5,305,435 | A | 4/1994 | Bronson |
| 5,313,575 | A | 5/1994 | Beethe |
| 5,325,481 | A | 6/1994 | Hunt |
| 5,343,409 | A | 8/1994 | Satterfield et al. |
| 5,347,628 | A * | 9/1994 | Brewer et al. ............... 715/775 |
| 5,371,844 | A | 12/1994 | Andrew et al. |
| 5,384,911 | A | 1/1995 | Bloomfield |
| 5,386,564 | A | 1/1995 | Shearer et al. |
| 5,412,776 | A | 5/1995 | Bloomfield et al. |
| 5,422,993 | A | 6/1995 | Fleming |
| 5,579,469 | A | 11/1996 | Pike |
| 5,583,984 | A | 12/1996 | Conrad et al. |
| 5,657,049 | A | 8/1997 | Ludolph et al. |
| 5,680,562 | A | 10/1997 | Conrad et al. |
| 5,714,971 | A | 2/1998 | Shalit et al. |
| 5,737,737 | A | 4/1998 | Hikida et al. |
| 5,745,096 | A | 4/1998 | Ludolph et al. |
| 5,754,174 | A | 5/1998 | Carpenter et al. |
| 5,767,834 | A | 6/1998 | Vouri et al. |
| 5,825,348 | A | 10/1998 | Ludolph et al. |
| 6,061,061 | A | 5/2000 | Conrad et al. |
| 6,642,944 | B2 | 11/2003 | Conrad et al. |

FOREIGN PATENT DOCUMENTS

| | | |
|---|---|---|
| EP | 0 514 307 A3 | 11/1992 |
| FR | 2693810 | 6/1991 |
| WO | WO 89/11964 | 11/1989 |

OTHER PUBLICATIONS

Lam, et al., "The NewWave Office," Hewlett-Packard Journal, Aug. 1990, vol. 40, No. 4, p. 23-31.

"Virtual Office Desktop Drawers," Research Disclosure, No. 305, Sep. 1989, p. 651.

"Using Desk Top and Drawers to Predefine Paths," Research Disclosure, No. 312, Apr. 1990, p. 298.

"Developer's Desktop," IBM Tech. Disclosure, vol. 33, No. 6B, Nov. 1990, pp. 114-117.

"Preliminary Research Report," No. 9206603000, INPI, Feb. 2, 1996.

The NeXT™ "User's Reference Manual," c1989 by NeXT™, Inc., pp. 10-12, 99-102.

Videotape of NeXT™ Computer Operating with NeXT™ Operating System (1989).

Cowart, Robert. Mastering Windows 3.1. SYBEX Inc., 1992, pp. 7-30, 52-57 and 149-162.

Maria E. Tyne, Thinking Person's Guide to OS/2 2.1, John Wiley & Sons Inc., 1993, pp. 5-12.

Apple Computer, "Inside Macintosh", 1992 Addison-Wesley, Ch. 6, pp. 107-130.

Richard Mander, et al., "A 'Pile' Metaphor for Supporting Casual Organization of Information", ACM Conference on Human Factors in Computing Systems (CHI '92 Conference Proceedings): Striking a Balance (May 3, 1992), pp. 627-634.

IBM Technical Disclosure Statement, "Notebook Tabs as Target Location for Drag/Drop Operations" (Dec. 1992), vol. 35, No. 7, p. 207.

Microsoft Windows™ User's Guide, Microsoft Corporation, 1985-1990, p. 97.

Screen Dumps from Microsoft Windows™ V3.1, Microsoft Corporation 1985-1992, pp. 1-10.

Jeff Duntemann, "Complete Turbo Pascal", Scott Foresman and Comapany, Third Edition, pp. 528-548.

Jeff Johnson, et al., "The Xerox Star: A Retrospective", Computer, Sep. 1989, pp. 11-27.

Brad A. Myers, "Window Interfaces, A Taxonomy of Window Manager User Interfaces", IEEE Computer Graphics and Applications, Sep. 1988, pp. 65-83.

"Automatic Window Management Mode", IBM Technical Disclosure Bulletin, vol. 35, No. 4B, Sep. 1992.

* cited by examiner

COMPUTER SYSTEM WITH GRAPHICAL USER INTERFACE INCLUDING SPRING-LOADED ENCLOSURES

This application is a continuation of U.S. patent application Ser. No. 11/187,078, filed Jul. 21, 2005, now U.S. Pat. No. 7,549,126 which is a continuation application of U.S. patent application Ser. No. 09/964,723, filed Sep. 25, 2001 (now U.S. Pat. No. 6,928,621), which is a continuation of U.S. Ser. No. 09/565,912, filed May 5, 2000 (now U.S. Pat. No. 6,307,545), which is a continuation of U.S. patent application Ser. No. 08/889,719, filed Jul. 8, 1997 (now U.S. Pat. No. 6,061,061), which is a continuation of U.S. application Ser. No. 08/482,186, filed Jun. 7, 1995 (now U.S. Pat. No. 5,680,562), which is a continuation application of U.S. application Ser. No. 08/076,253, filed Jun. 11, 1993 (now U.S. Pat. No. 5,583,984).

BACKGROUND OF THE INVENTION

1. Field of the Invention

The present invention relates to computer systems with graphical user interfaces, such as window based systems; and more particularly to techniques for finding, moving, and copying objects in such systems.

2. Description of the Related Art

Graphical user interfaces on computer systems are gaining widespread use. Typical systems include the Macintosh Finder™ environment in Macintosh computers provided by Apple Computer, Inc., of Cupertino, Calif., the Windows environment provided by Microsoft Corporation of Redmond, Wash., and the New Wave™ environment provided by Hewlett-Packard of Palo Alto, Calif. In such systems, a workspace on the display system is set up with a desktop metaphor. Within the desktop, there are icons displayed which correspond to objects stored in memory. Many icons represent enclosures that enclose other objects. Opening the enclosure results in display of a window that encloses related icons.

These systems provide the ability to move an object from an enclosure represented by an icon within one window to an enclosure represented by another window or icon, or to copy an object represented by an icon within one window into an enclosure represented by another window or icon. These operations involve first setting up a destination window. The problem of setting up the destination window may be quite complicated, when the system involves a complex hierarchy of enclosures. Further, the process of setting up the destination window may clutter the desktop with a number of windows, obscuring the windows actually in use.

After setting up the destination window, the cursor is moved to an icon representing the object to be placed in the destination window by the move or copy operation. A drag operation is then executed to move the icon into the destination window. The drag operation typically involves placing the cursor over the icon subject of the drag operation, depressing the mouse button, and while the mouse button remains depressed, moving the cursor into the destination window. The mouse button is released when the cursor is over the destination window. The operating system responds to this manipulation of the graphical interface by either moving the object into the destination window if both the object and the destination are stored on the same disk, or copying the object into the destination window if the destination is on a different disk than the object.

Finally, after the drag operation, the user must clean up the desktop by closing the unneeded windows that were opened during the process of setting up the destination window.

As can be appreciated, this process is quite cumbersome when the destination window is deep in a hierarchy. Also, the problem of setting up the destination window makes initiation of a drag operation problematic. It would be desirable to be able to browse through the storage system hierarchy after the drag operation has begun.

SUMMARY OF THE INVENTION

The present invention provides a new behavior in a graphical user interface which allows the user to open and close enclosure windows, while dragging an object. When the user pauses, gestures, or rolls over a hot spot on top of an identifier representing a closed enclosure, a temporary window for the closed enclosure is "sprung open" to allow the user to browse inside the enclosure and possibly open another enclosure contained within the sprung open window. This process can be carried on throughout a deep hierarchy of windows as the user browses for a destination for the drag operation.

The user may close sprung open windows by simply moving the cursor out of the sprung open window, or by making some other indication with the pointing device, as suits the needs of a particular design.

Further, if an enclosure to be sprung open was previously open on the desktop, the previously opened window may zoom over to the current cursor position, and then return to its original position when the user moves the cursor out of the window.

Accordingly, the present invention can be characterized as an apparatus for finding or browsing among enclosures in a computer system which includes a display, a memory, and a pointing device with which the user drags a pointer (cursor) on the display. The apparatus includes a storage system that stores a plurality of objects which include enclosures in the memory. The enclosures comprise objects which may enclose other objects, and when opened, are represented by a window on the desktop. The system includes window management software that draws windows on the display corresponding to opened enclosures. Also, a mouse with a mouse button, or other input device is included which supplies a signal to indicate a drag operation. The spring loaded enclosures are managed with software responsive to a drag during a drag operation of the pointer over an identifier (textual or graphical) corresponding to a particular enclosure for opening a temporary window for the particular enclosure to display icons within the temporary window that correspond to the objects enclosed by the particular enclosure. Further, the spring-loaded enclosure management software is responsive to a drag during the drag operation of the pointer outside the temporary window for closing the temporary window.

By releasing the mouse button or otherwise indicating an end of the drag operation, the user signals software for placing the particular object subject of the drag into the particular enclosure which has been sprung open during the drag.

The spring-loaded enclosure management software further determines whether the display includes an existing window opened for the particular enclosure during the drag operation to open a temporary window, and, if so, then removing the existing window from the display and drawing the temporary window on the display centered around the cursor, or otherwise associated with the position of the identifier corresponding to the particular enclosure. Also, in one aspect, the invention provides for graphically indicating on the display a zoom of the existing window over to the location of the temporary window. When the temporary window is closed, the existing window may be re-drawn on the display at its original position.

The decision to open a temporary window during a drag operation may be conditioned on actions by the user of the pointing device, such as pausing over the identifier for the particular enclosure, or making some other gesture. For instance, the identifier for enclosures that may be opened may include a hot region or temporary window area. Moving the cursor over the temporary window area of the identifier will cause the enclosure to be sprung open. Alternatively, moving the cursor over an identifier of an enclosure may cause display of a split selector graphic. Moving the cursor to a particular side of the split selector graphic will cause the enclosure to spring open; while moving to the other side of the split selector graphic will cause the split selector graphic to be removed from the screen.

Thus, using the spring-loaded enclosure mechanism of the present invention, the user of a graphical user interface is free to browse through enclosures while dragging, rather than being forced to set up the source and destination before the drag begins. This greatly increases the ease of use of the graphical user interface.

Other aspects and advantages of the present invention can be seen upon review of the figures, the detailed description, and the claims which follow.

DESCRIPTION OF THE PREFERRED EMBODIMENTS

Figure 1:
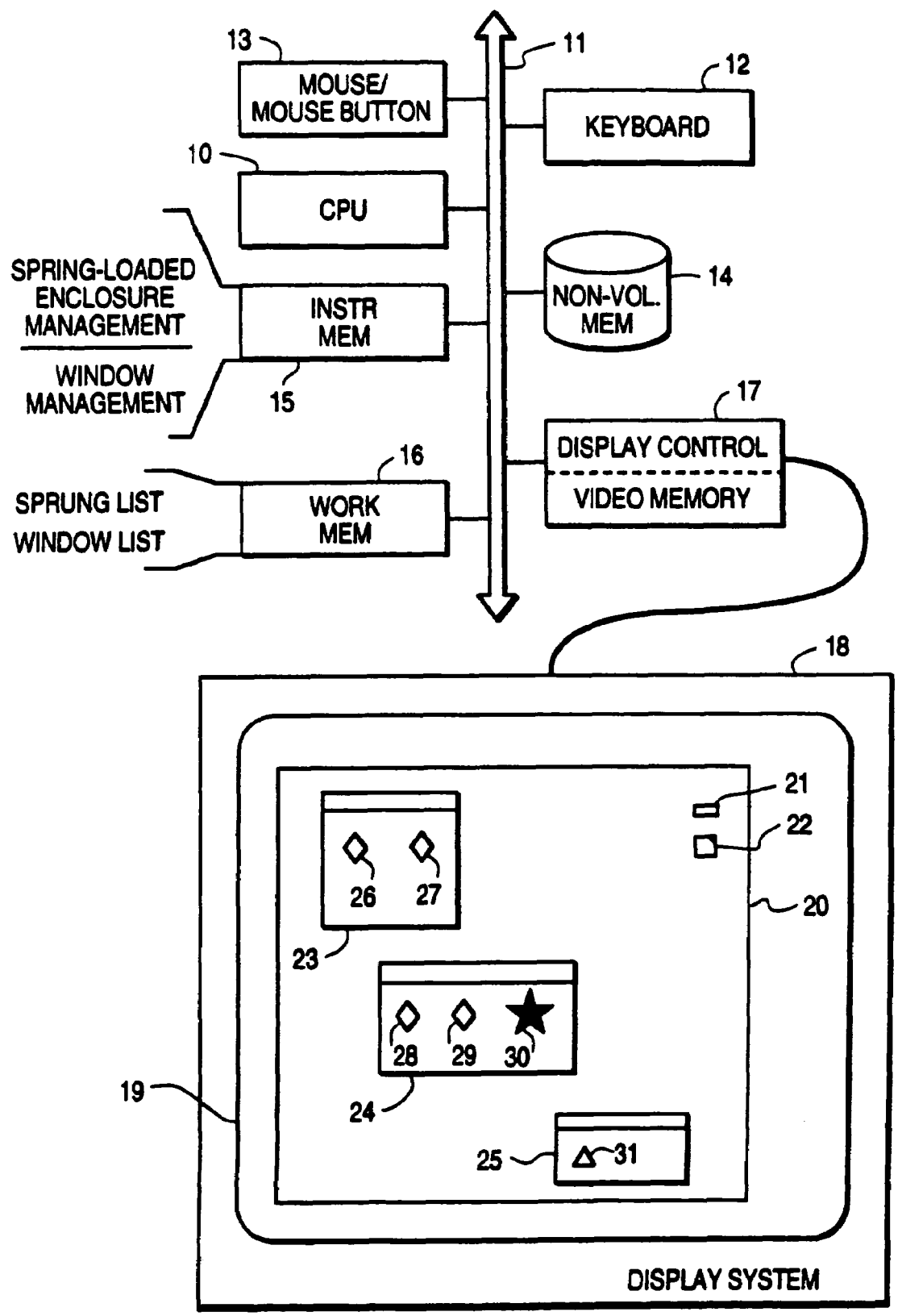
FIG. 1 is a schematic diagram of a computer system implementing the spring-loaded enclosure management of the present invention.

A detailed description of a preferred embodiment of the present invention is provided with respect to the figures. FIG. 1 provides a system overview. FIGS. 2A-2D and 3A-3E illustrate the operation of the graphical user interface using spring-loaded enclosures. FIGS. 4-13 illustrate an implementation of the control software for a system executing the present invention. FIGS. 14A-14B and 15A-15B illustrate alternatives for opening spring-loaded enclosures.

I. System Overview (FIGS. 1, 2A-2F, and 3A-3E)

FIG. 1 illustrates a computer system implementing the spring-loaded enclosure feature of the present invention. The computer system includes a host CPU 10 coupled to a system bus 11. The system includes a keyboard 12, a mouse 13 including a mouse button, or other pointing device, and a non-volatile memory 14, such as a hard disk, floppy disk, non-volatile integrated circuit memory systems, or the like. Similarly, instruction memory 15 and working memory 16 are coupled to the bus 11. The instruction memory 15 stores spring-loaded enclosure management software and window management software, among other software needed for operation of the system. The working memory 16 is used to maintain a list of sprung open enclosures, and a window list or other tables needed by the software in the instruction memory 15.

Finally, the system includes a display controller 17 which includes video memory. The display controller 17 drives a display 18 such as a CRT video monitor, LCD flat panel display, or the like. The display system 18 has a screen, generally 19. On the screen 19, a workspace 20 is displayed. The workspace 20 is implemented with a desktop metaphor in the Macintosh type systems. Within the desktop 20, a plurality of identifiers may be displayed, such as the identifier 21 representing a hard disk drive, the identifier 22 representing a floppy disk, and other identifiers not shown which represent files, applications, control panels, or enclosures which enclose other objects. Also on the desktop 20, a plurality of windows, such as windows 23, 24, and 25 may be opened. The windows 23, 24, and 25 enclosed identifiers, such as identifiers 26 and 27 in window 23, identifiers 28, 29, and 30 in window 24, and identifier 31 in window 25.

In the figure, the identifiers are shown as graphical elements, or icons. Alternative identifiers may be textual elements, such as the name of the corresponding object. The behaviors described herein may be applied to both textual and graphical elements, as may occur in windows opened in a view by name mode or a view by icon mode in Macintosh computers.

In the illustration of FIG. 1, the desktop 20 is somewhat smaller than the screen 19. Alternative systems may extend the desktop metaphor to the entire area of the screen 19.

The spring-loaded enclosure management software and window management software in the instruction memory 15 of the system are used to open and close windows, and to maintain records concerning the open and closed windows, and their positions within the desktop 20, the location of icons within the windows or on the desktop 20, and the like. During a drag operation, the spring-loaded enclosure management software in the instruction memory 15 is operable to create temporary windows so that the user may browse during the drag operation as described above.

Examples of the operation of the spring-loaded enclosures are provided with reference to FIGS. 2A-2F and 3A-3E. In these diagrams, the same windows 23, 24, and 25 of FIG. 1 are used as a base for ease of understanding. The "star" identifier 30 in window 24 will be the particular object subject of the drag operation in the examples described.

Figure 2A:
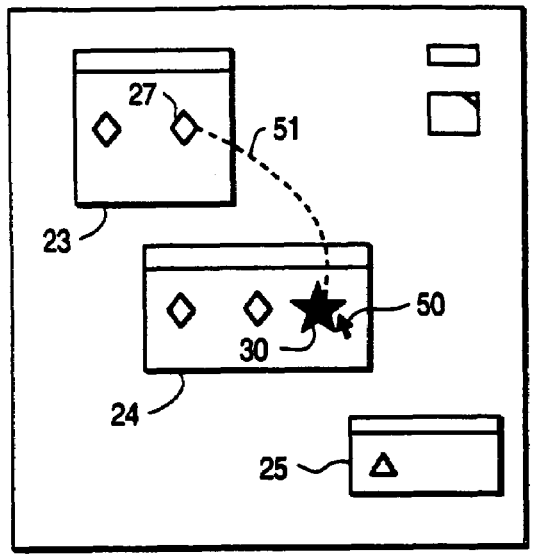
FIGS. 2A-2F illustrate a drag operation with spring-loaded enclosures according to the present invention.
Figure 2B:
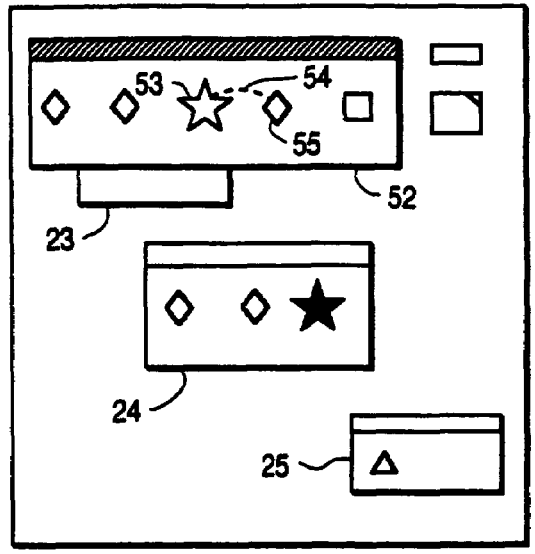
Figure 2C:
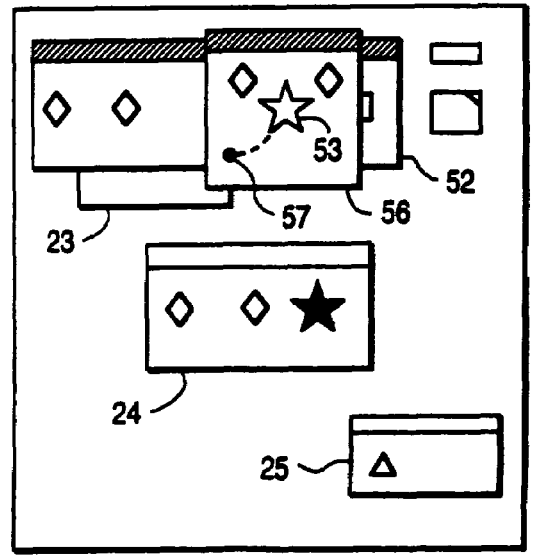
Figure 2D:
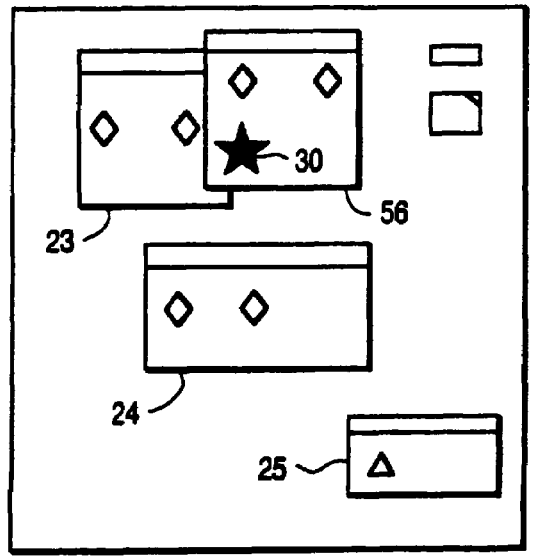

FIGS. 2A-2F illustrate a basic drag operations using spring-loaded enclosures. In FIG. 2A, the identifier 30 in window 24 is selected for a drag operation by moving the cursor 50 over the icon 30, depressing the mouse button and dragging the cursor along a path 51 while holding the mouse button down. The user pauses the cursor over identifier and causes a temporary window 52, shown in FIG. 2B, to open substantially centered over the cursor, and thus over identifier 27. Because the temporary window 52 is slightly too wide to open precisely centered over the cursor 27, it is redrawn within the desktop area as close as possible to the preferred location centered over the cursor. During the drag operation, the cursor carries an altered view 53 (e.g., an outline) of the star identifier 30 and is displayed within the temporary window 52. The drag operation continues along path 54 over identifier 55 within the temporary window 52. By pausing over the identifier 55, a temporary window 56, as shown in FIG. 2C, is opened, centered over the identifier 55. The altered view 53 of the identifier and the cursor now reside within the temporary window 56. The user then completes the drag operation to point 57 by releasing the mouse button. This results in placing the identifier 30 within the temporary window 56, as shown in FIG. 2D. Also, window 52 closes on mouse up, because it is not the destination. The identifier 30 is removed from window 24 if the temporary window 56 resides on the same disk as temporary window 24. Otherwise, the icon 30 is copied and will remain in both enclosures.

As shown in FIG. 2D, the temporary window 56 becomes a regular window on the display, as indicated by removal of the hatching across the top of the window 56. In implementation, temporary windows may be displayed in the same manner as other windows, or marked somehow as temporary. Also, at the end of the drag operation, all of the temporary windows, other than the destination window, are removed from the display. Thus, the temporary window 52 is no longer displayed within the desktop as shown in FIG. 2D.

Figure 2E:
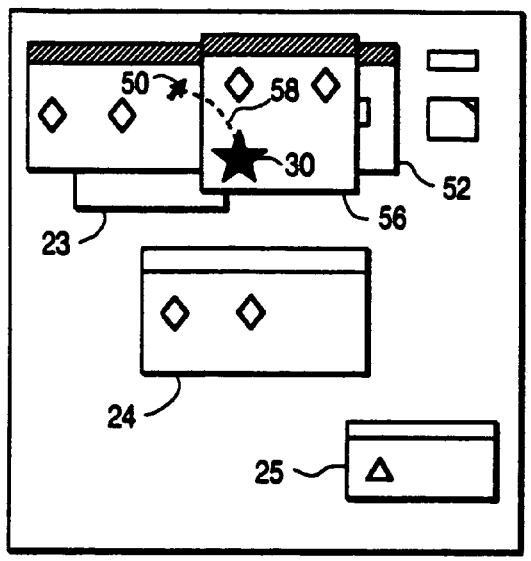
Figure 2F:
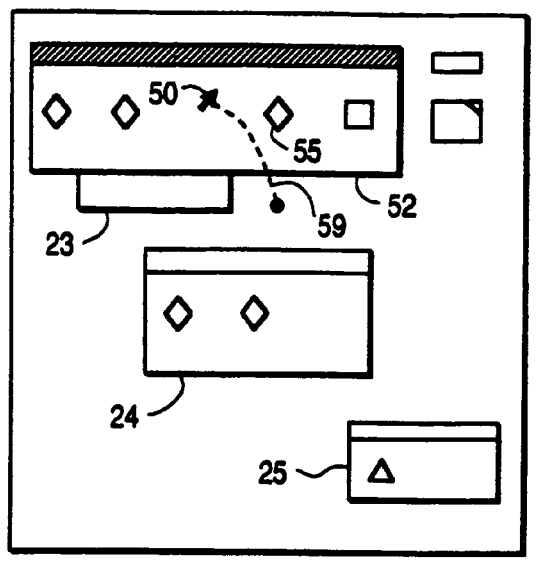

FIGS. 2E and 2F illustrate an alternative behavior. In this aspect, the temporary windows, such as window 52, do not automatically close after termination of the drag operation which leaves the star icon 30 in window 56. Rather, the temporary windows are closed in response to movement of the pointer after termination of the drag outside of the particular temporary window. Thus, as illustrated in FIG. 2E, if after termination of the drag, the user moves the cursor along path 58 outside temporary window 56, then the temporary window 56 will be removed from the screen. Temporary window 52 as illustrated in FIG. 2F remains on screen because the cursor remains within that temporary window. If the user then moves the cursor along path 59 outside temporary window 52, then temporary window 52 will be removed, returning the screen to the configuration of FIG. 2A, except with the star icon 30 moved. The user, according to this aspect, may choose to maintain a temporary window open by clicking the mouse button while the cursor lies within the temporary window. Thus, if after completion of the drag operation in FIG. 2D, the user had clicked the mouse to select window 56 as a permanent window, and then moved the mouse out of window 56, such as along path 59, then the screen would be left in the configuration of FIG. 2D. Alternatively, the user could opt to maintain window 52 as a permanent window by clicking within the window when the cursor is positioned as shown in FIG. 2F.

Figure 3A:
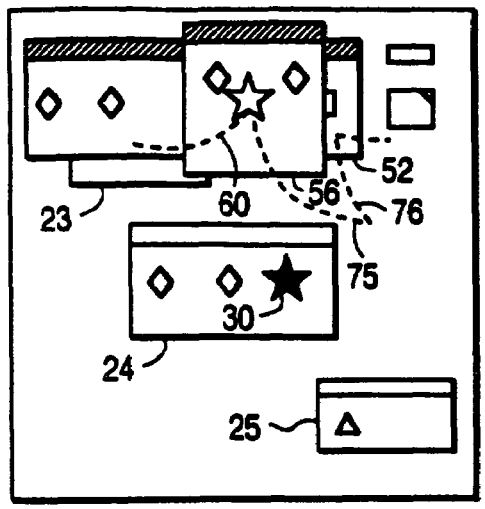
FIGS. 3A-3E illustrate alternative drag sequences using spring-loaded enclosures according to the present invention.
Figure 3B:
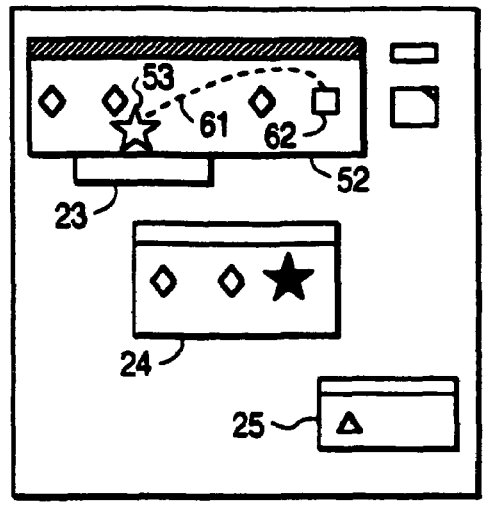

FIG. 3A illustrates the beginning of an alternative sequence, using the spring-loaded enclosure system of the present invention. FIG. 3A correspond closely to FIG. 2C. However, in this instance, the user executes a drag operation along the path 60 which crosses the boundary of the temporary window 56 back into temporary window 52. When the boundary of temporary window 56 is crossed, the temporary window 56 is removed from the screen, as illustrated in FIG. 3B, and the altered view 53 of the identifier and the cursor reside within temporary window 52. If the user had moved the cursor along path 75, rather than path 60, temporary window 56 would close, but temporary window 52 would remain open. The user could close temporary window 52 by moving the cursor back into temporary window 52 and then back out as illustrated by path 76.

Figure 3C:
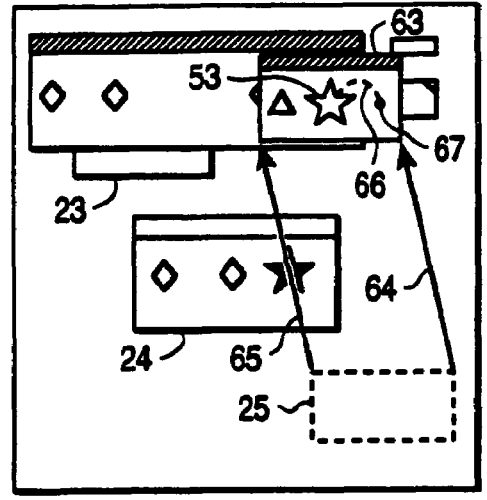

As shown in FIG. 3B, the user continues to browse by dragging along the path 61 to identifier 62. By pausing over the identifier 62, temporary window 63, as illustrated in FIG. 3C, is opened, centered over the identifier 62. Also, the altered view 53 of the identifier and the cursor reside within temporary window 63.

FIG. 3C also illustrates what happens when the temporary window 63 corresponds to a window, e.g., window 25, which already existed on the desktop before the drag operation began. In this instance, the window 25 is removed from the screen. Also, a zoom operation indicated by the arrows 64 and 65 is graphically depicted on the screen to indicate to the user the movement of the window 25 to the temporary window 63. This zoom operation can take a variety of graphical characteristics difficult to show in the storyboards of FIGS. 3A-3E. However, it will be understood by those skilled in the art how this operation is accomplished.

Figure 3D:
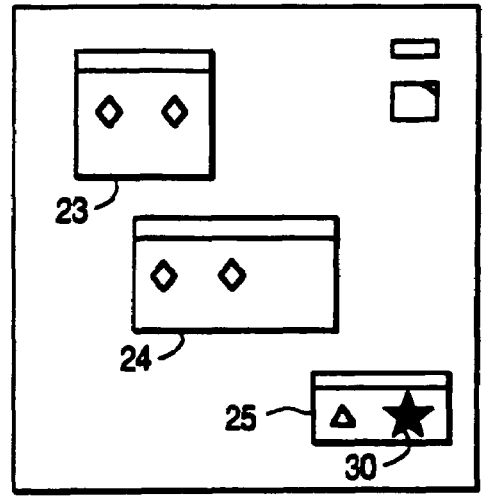
Figure 3E:
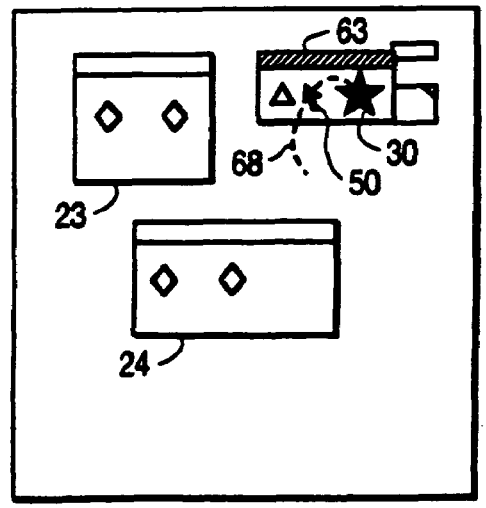

In FIG. 3C, the drag operation continues along path 66 to point 67, and the mouse button is released indicating the end of the drag operation. FIG. 3D illustrates one alternative outcome. In this case, the identifier is moved into the temporary window 63 and the temporary window is moved back to the original position of window 25. Window 25, including the identifier 30, remains on the screen. The identifier 30 has been removed from window 24 because windows 25 and 24 reside on the same disk. Alternatively, the user may have the option of keeping the temporary window 63 as the permanent window. This is illustrated in FIG. 3E. After the drag operation, the identifier 30 is left within the temporary window 63. The cursor 50 returns to its normal shape. The user has the option of closing the temporary window, which leaves the position of the real window unaffected. When the enclosure is opened again, the window will be located in its old location. If the user chooses not to close the temporary window but rather moves or resizes the temporary window before closing it, when the window is subsequently re-opened it will be located at the new position and size.

In the illustrations of FIGS. 2A-2D and 3A-3E, temporary windows are indicated by hatching a bar across the top of the window. In a preferred system, these windows may be rendered translucent, or other effects may be used as suits the needs of a particular implementation. As mentioned above, some means of indicating a temporary window, as opposed to a regular window, may be provided within the desktop.

II. Interface Management Logic Implementation (FIGS. 4-13)

Figure 4:
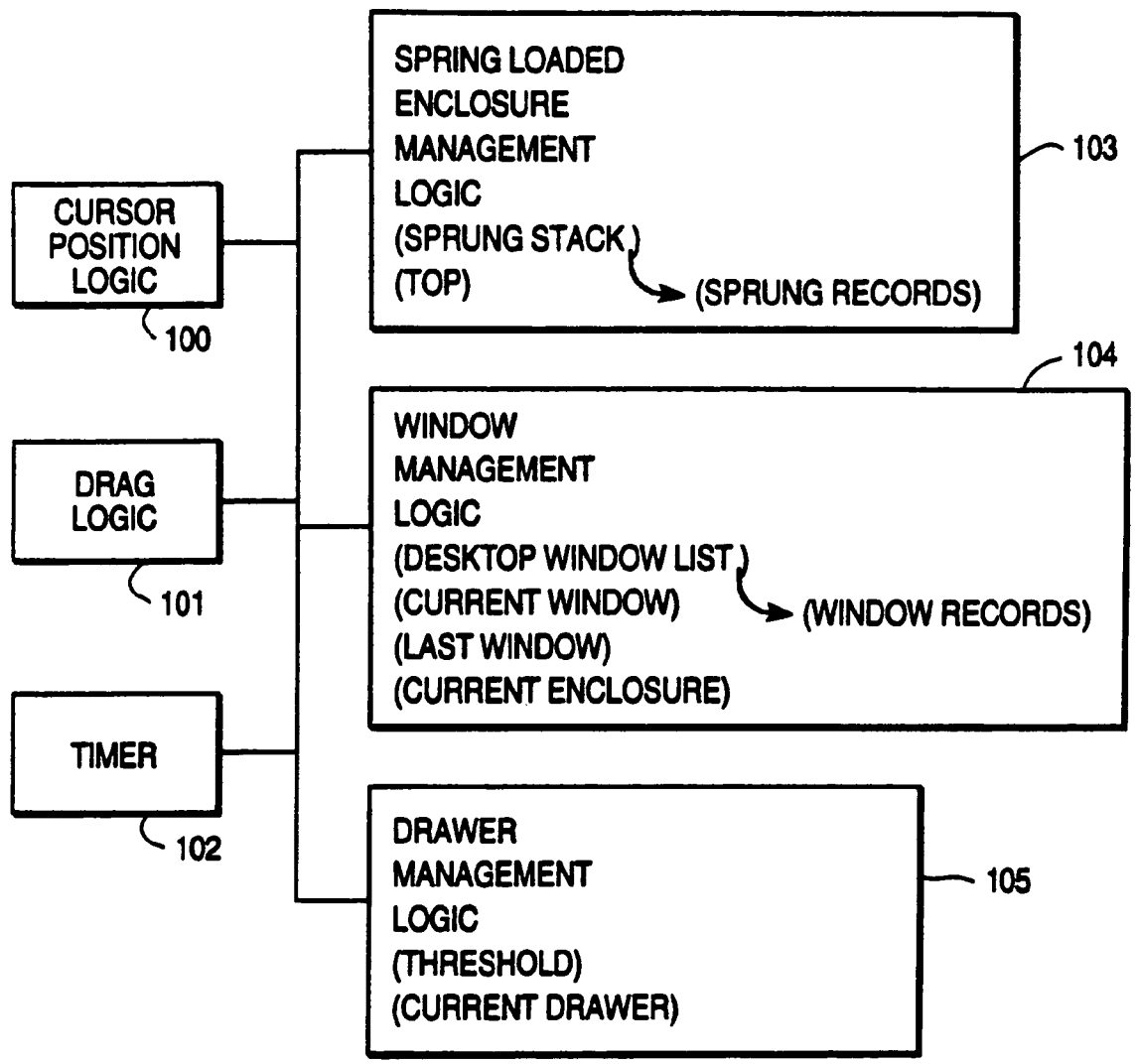
FIG. 4 is a block diagram of functional components of the user interface control system according to the present invention.
Figure 5:
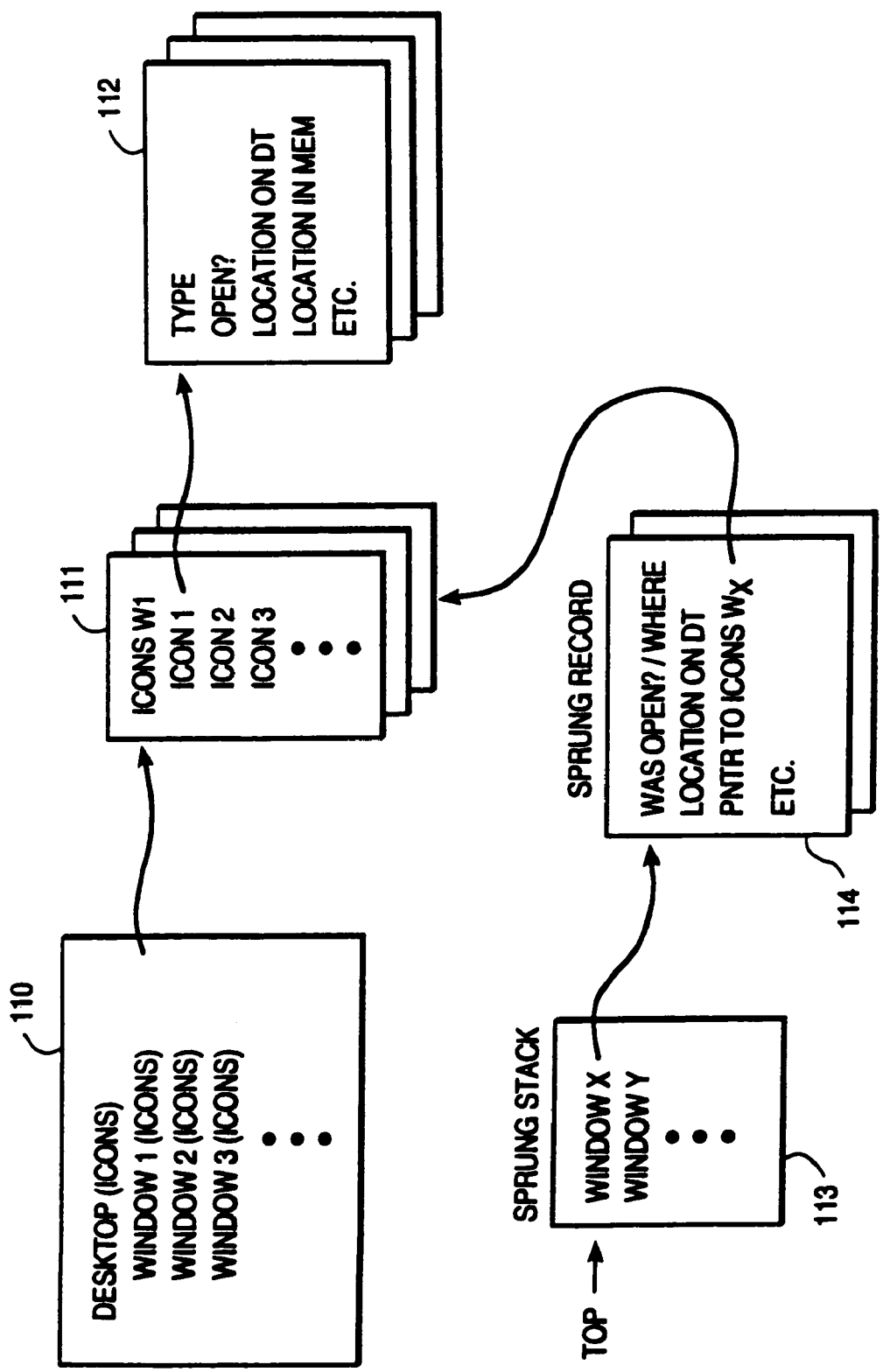
FIG. 5 is a schematic diagram of data structures used by the system of FIG. 4.

As mentioned with reference to FIG. 1, a computer system implementing the spring-loaded enclosure mechanism according to the present invention includes control software. FIGS. 4 and 5 provide a conceptual software architecture for managing spring-loaded enclosures according to the present invention.

As shown in FIG. 4, the system includes cursor position logic 100 which maintains information concerning the current position of the cursor within the desktop area on the display. Also, drag logic 101 monitors the mouse actions including the mouse button and movement of the mouse to indicate the execution of a drag operation. Obviously with pointing devices other than a mouse, a drag operation may be indicated by a variety of user actions.

The system also includes timer logic 102 for detecting a pause of the cursor over a particular identifier in the spring-loaded enclosure management routine. Also, the timer 102 may be used for other purposes.

Also included in the control software is spring-loaded enclosure management logic 103. This management logic maintains a list of temporary windows referred to, as the "Sprung Stack", and an indicator of the Top temporary window in the Sprung Stack. The Sprung Stack consists of a set of pointers to records that identify the state of the temporary windows. These records are referred to as Sprung Records.

The system further includes window management logic 104 which performs a variety of functions known to those of skill in the art for managing windows. This window management logic includes a system for opening and closing windows on the desktop in response to pointer actions, and maintains a desktop Window List. The desktop Window List comprises a list of windows that are opened on the desktop, their positions on the desktop, and other characteristics of the window, including the location, the types of windows, and information about icons, if any, enclosed by the window. Further, enclosure windows in the list point to a window record that contains information about the enclosures that are represented by identifiers in the windows, and such other information as is needed.

In cooperation with the drag logic 101, the window management logic 104 maintains a parameter referred to as the Current Window, which indicates the window within which the cursor currently resides. Also, the window management logic 104 maintains a parameter referred to as the Last Window which indicates the last window which the cursor was over, for instance if the cursor moves from inside a window to outside a window. Finally, the window management logic maintains a record referred to as the Current Enclosure which indicates the identifier that the cursor is presently positioned over.

A final component of the control software is known as the drawer management logic 105. The drawer management logic manages windows which are maintained on the screen with a desk drawer metaphor. In particular, the windows are positioned along the periphery of the desktop. They can be slid off the desktop leaving only a drawer identifier on the perimeter of the desktop display. When the desk drawer window is opened in response to a cursor action executed by the user, the window slides onto the screen obscuring any windows underneath it. When the user is done with the window, it can be slid back offscreen to reveal the underlying windows. The desk drawer management logic 105 maintains a Threshold parameter which indicates the distance from the perimeter of the desktop within which a cursor movement will result in opening of the drawer, and a Current Drawer parameter indicating the drawer within which the cursor is currently positioned.

The drawer management logic is described in detail in our co-pending U.S. patent application entitled COMPUTER SYSTEM WITH GRAPHICAL USER INTERFACE INCLUDING DRAWER-LIKE WINDOWS, invented by Thomas J. Conrad and Elizabeth Moller.

FIG. 5 illustrates the basic data records maintained by the spring-loaded enclosure management logic 103 and the window management logic 104. In particular, the window management logic 104 maintains a desktop window list 110. It includes an entry for the desktop with a set of pointers to a list of identifiers within the desktop. Also, each enclosure which is opened as a window within the desktop is added to the list as indicated. Thus, the list includes window 1, window 2, window 3, etc. Associated with each window, e.g., window 1, is an icon pointer which points to a record of identifiers, e.g., record 111. Each identifier within window 1 is maintained in a list 111. Thus, identifier 1 includes a pointer to an enclosure record 112, which indicates the type of enclosure, whether the enclosure has been opened on the desktop, the location on the desktop of the identifier, the location in memory of the object represented by the identifier, etc. If the identifier has been opened on the desktop, then information about its location will be included in the window list 110.

The spring-loaded enclosure management logic 103 maintains a Sprung Stack 113. This includes a list of temporary windows, window X, window Y, and so on, which have been opened during a drag operation according to the present invention. Each entry in the Sprung Stack points to a Sprung Record 114. The Sprung Record maintains such information about the temporary window as whether the window was previously opened on the desktop and, if so, where; the location on the desktop of the temporary window; a pointer to a list of identifiers (e.g., 111) for the temporary window; etc.

Figure 6:
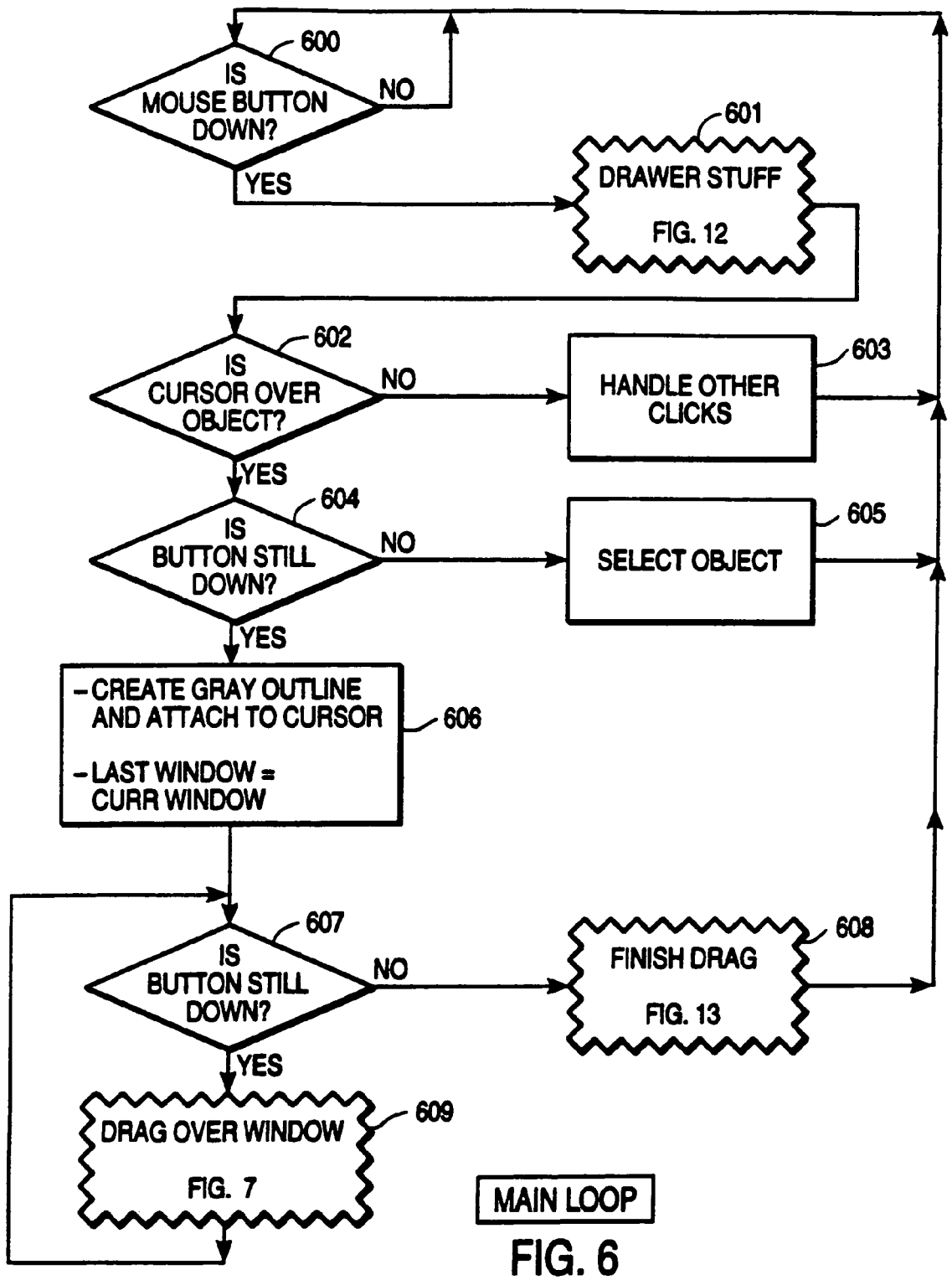
FIGS. 6-13 provide flow charts for the operation of the system of FIG. 4.

A functional flow chart for executing the spring-loaded enclosure management is provided with reference to FIGS. 6-13, in which FIG. 6 is the Main Loop. The Main Loop shown in FIG. 6 begins at block 600 where it monitors the mouse button. If the mouse button is not down, the algorithm loops at block 600. If the mouse button is down, then the algorithm passes through the Drawer Stuff routine which handles clicks of the mouse button in drawers represented by block 601 which is shown in detail in FIG. 12. After the Drawer Stuff routine 601, the algorithm tests to determine whether the cursor is over an object (block 602). If it is not over an object, then the algorithm handles other clicks and cursor operations (block 603) and loops to block 600. If the cursor is over an object at block 602, then the algorithm monitors the mouse button (block 604). If the mouse button does not remain down, then a Select Object routine is executed, as indicated at block 605, and the algorithm loops to block 600. The select object routine 605 may result in a variety of operations as known in the art, such as opening an application window.

If the mouse button remains down at block 604, then a drag operation is indicated. In this case, the routine creates a grey outline (referred to as an "altered view" above) of the object and attaches the grey outline to the cursor. Also, the Last Window parameter is set equal to the Current Window parameter (block 606).

After block 606, the mouse button is monitored (block 607). If the mouse button is released, then the algorithm branches to the Finish Drag routine represented by block 608 which is shown in detail in FIG. 13. If the mouse button remains down, then the algorithm proceeds through the Drag Over Window routine represented by block 609 shown in FIG. 7. After the Drag Over Window routine at block 609, the algorithm loops to block 607 to monitor the drag operation.

Figure 7:
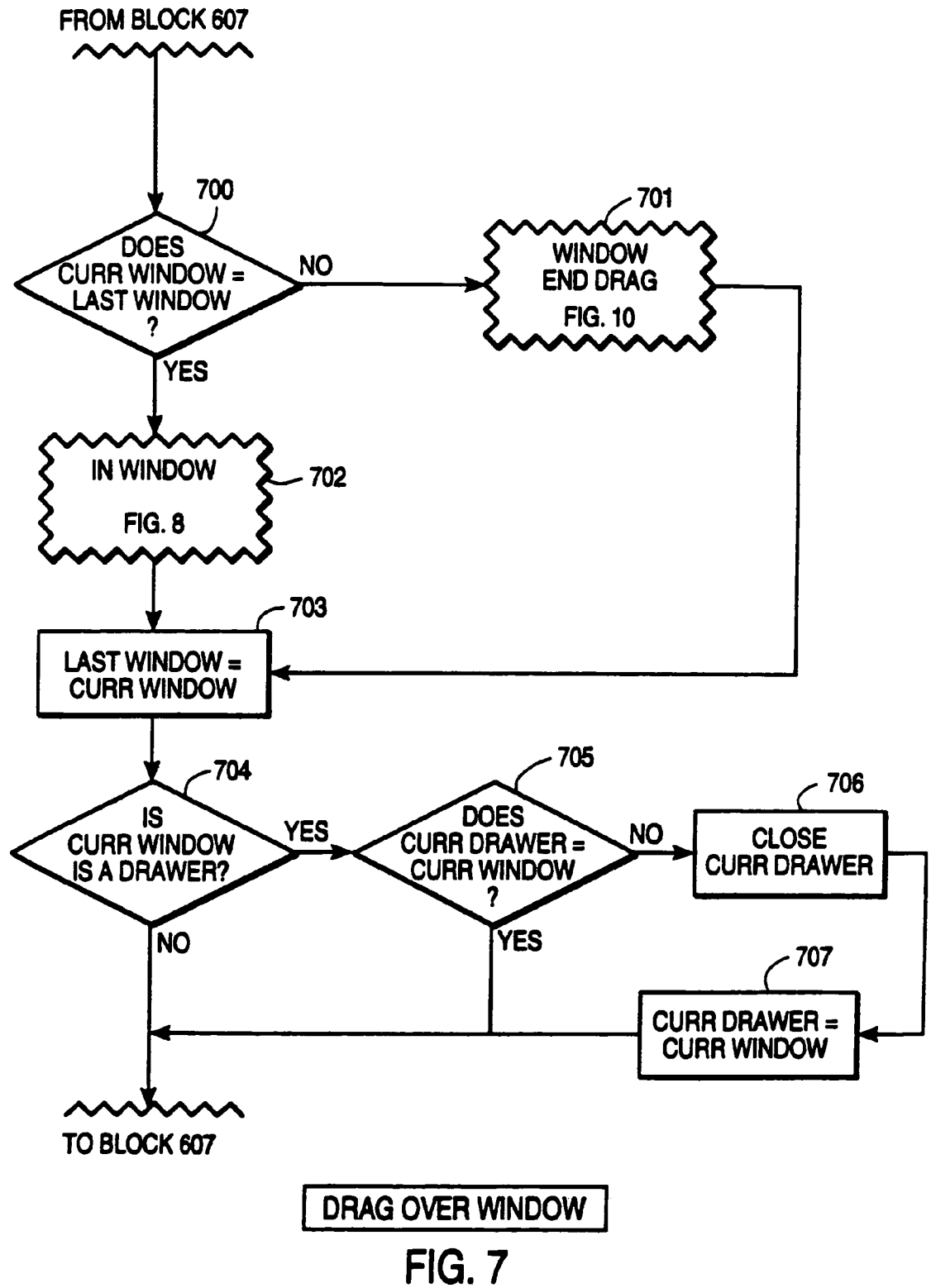

FIG. 7 illustrates the Drag Over Window routine represented by block 609 in FIG. 6. The Drag Over Window routine is started from block 607. First, it tests whether the Current Window parameter is equal to the Last Window parameter (block 700). If it is not equal, the border of the last window has been crossed and the algorithm branches to the Window End Drag routine represented by block 701 which is shown in detail in FIG. 10. If the Current Window remains equal to the Last Window (the cursor remains within the boundary of the window), then the algorithm branches to the In Window routine represented by block 702, as shown in detail in FIG. 8. From the Window End Drag routine of block 701, and the In Window routine of block 702, the algorithm proceeds through block 703 where Last Window is again set to Current Window. Next, the algorithm tests whether the Current Window is a drawer (block 704). If it is not a drawer, then the routine returns to block 607 of FIG. 6. If the Current Window is a drawer, then the algorithm tests whether the Current Drawer is equal to the Current Window (block 705). If not, then the cursor has moved out of the Current Drawer, and the Current Drawer is closed (block 706). The Current Drawer parameter is set to the Current Window in block 707 and the algorithm loops back to block 607 of FIG. 6. If, in block 705, the Current Window is not a drawer, the algorithm returns to block 607 of FIG. 6.

Figure 8:
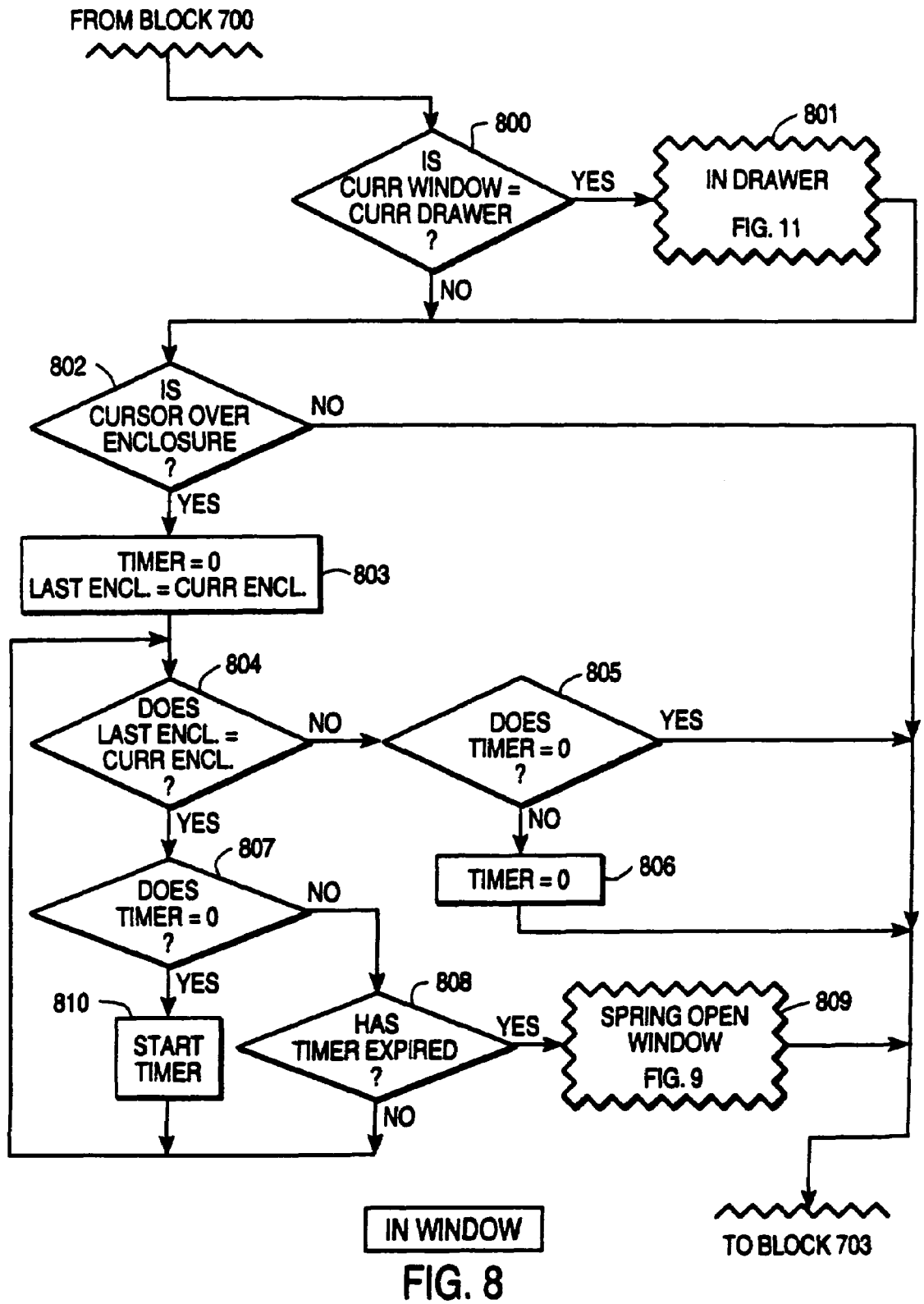
Figure 11:
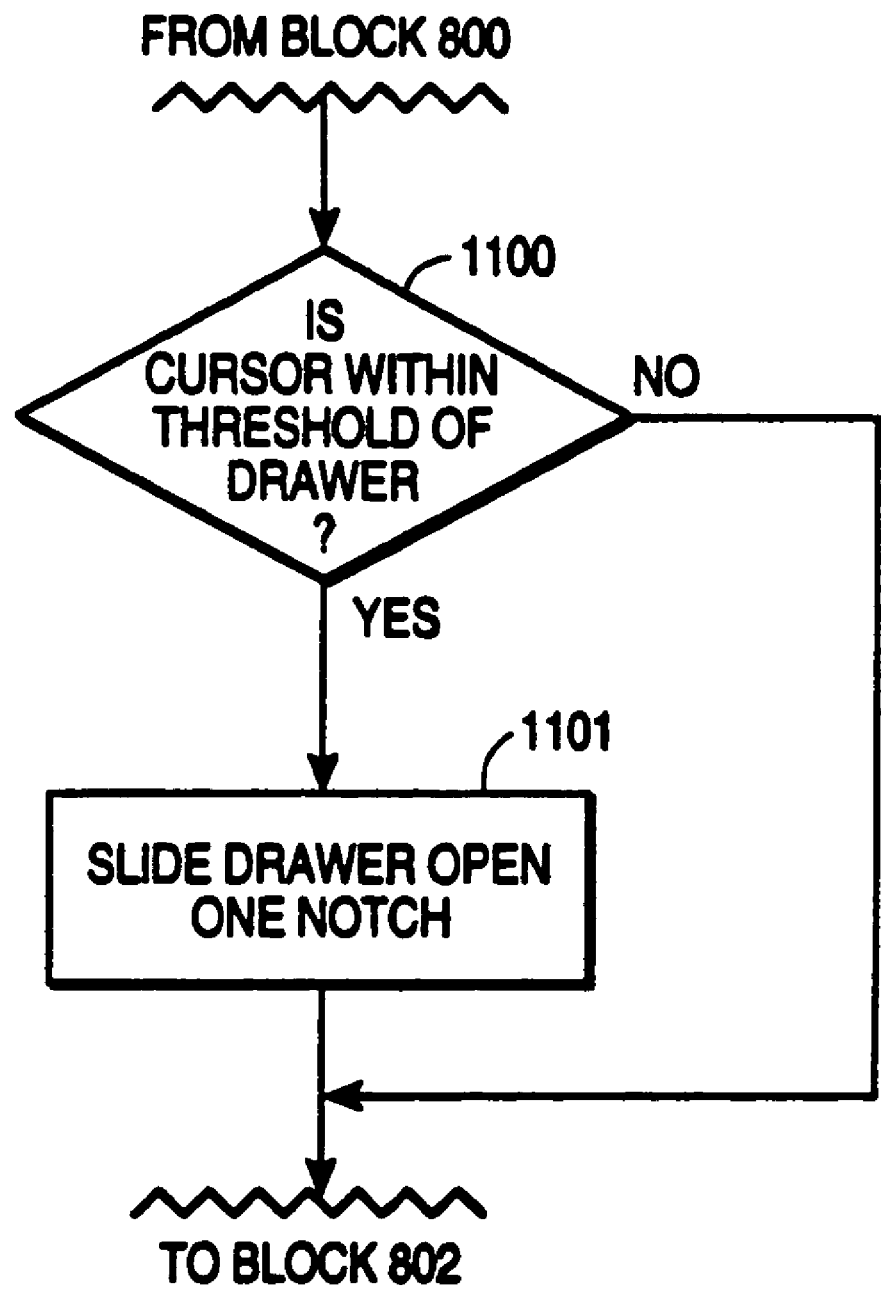

FIG. 8 illustrates the In Window routine represented by block 702 of FIG. 7. The In Window routine is entered from block 700 of FIG. 7. First, the algorithm tests whether the Current Window is equal to Current Drawer (block 800). If it is the Current Drawer, then the In Drawer routine represented by block 801 and shown in detail in FIG. 11 is executed. If the Current Window is not equal to the Current Drawer in block 800, and from the output of the In Drawer routine in block 801, the algorithm branches to block 802, where the algorithm determines whether the cursor is over an enclosure icon. If it is not over an enclosure icon, then the algorithm returns to block 703 of FIG. 7. Otherwise, the algorithm branches to block 803, where a timer is set to zero, and the Last Enclosure parameter is set equal to the Current Enclosure. Next, the algorithm monitors whether the cursor remains over the Current Enclosure by testing whether the Last Enclosure remains equal to the Current Enclosure in block 804. If it does not remain over the Current Enclosure, then the timer is tested (block 805). If the timer is equal to zero, then the algorithm branches to block 703 of FIG. 7. If it is not equal to zero, the timer is first reset to zero in block 806 and then returns to block 703 of FIG. 7.

Figure 9:
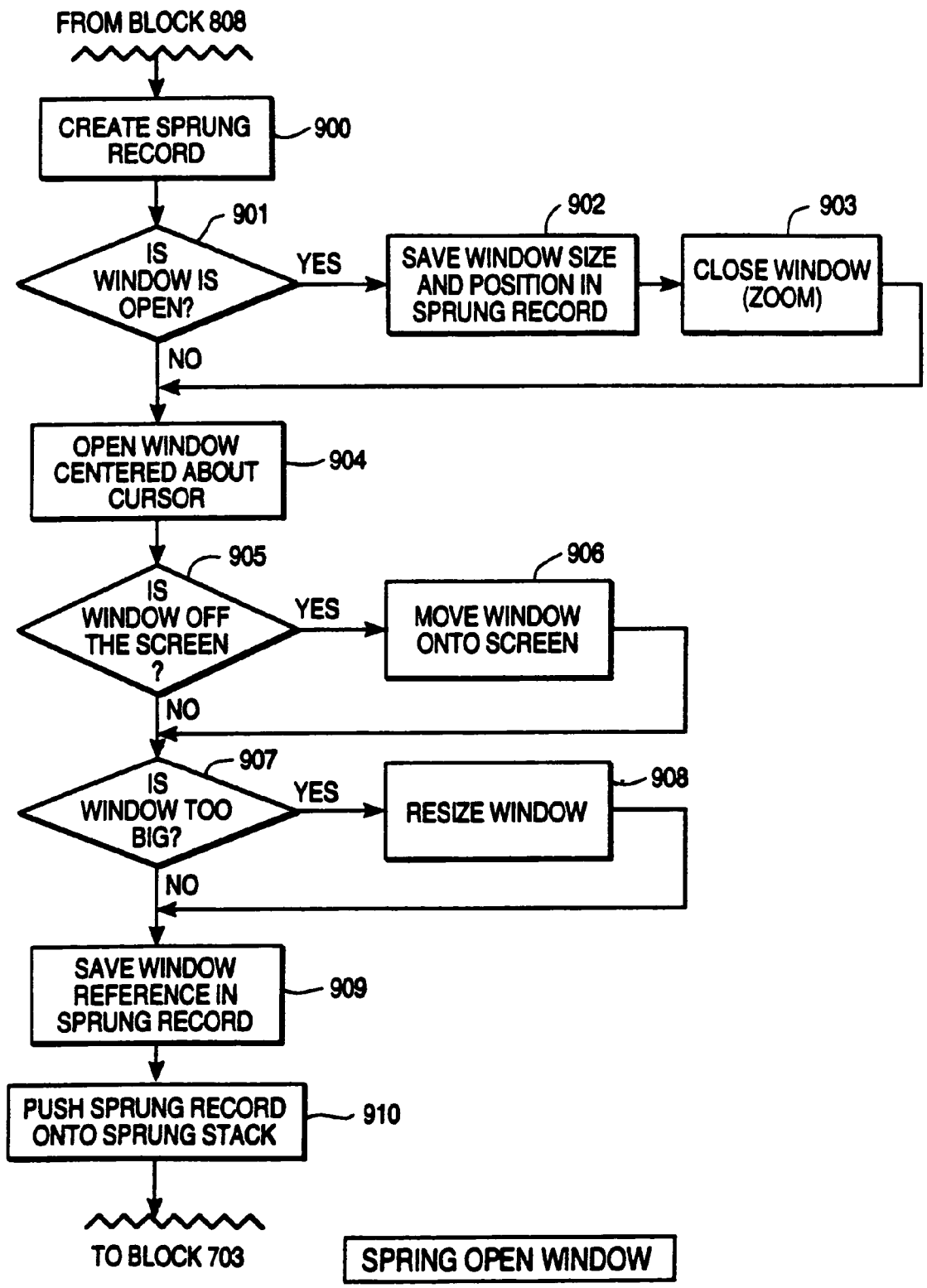

If, in block 804, the cursor remains over the Current Enclosure, the algorithm tests whether the timer is equal to zero in bock 807. If the timer is not equal to zero, the algorithm tests whether the timer has expired in block 808. If it has expired, then the Spring Open Window routine represented by block 809 and shown in detail in FIG. 9 is executed. After the Spring Open Window routine in block 809, the algorithm returns to block 703 of FIG. 7.

If in block 807 the timer was equal to zero, then the timer is started (block 810) and the algorithm loops to block 804 to begin monitoring whether the cursor remains over the enclosure until expiration of the timer.

FIG. 9 illustrates the Spring Open Window routine corresponding to block 809 of FIG. 8. The algorithm is entered from block 808 of FIG. 8. The first step is to create the Sprung Record for the particular window being sprung open (block 900). Next, the algorithm determines whether the window being sprung open is already open on the desktop (block 901). If it is already open, then the existing window size and position are saved in the Sprung Record (block 902). Next, the existing window is removed from the screen (block 903). Coupled with removing the existing window, a zoom operation may be executed to graphically illustrate movement of the window being closed to the new position.

If the window to be sprung open was not already open at block 901, or after block 903, the algorithm opens a temporary window centered about the cursor position (block 904). Next, the temporary window centered about the cursor position is tested to determine whether it is partially offscreen (block 905). If it is partially offscreen, then the window is moved onto the screen (block 906). After block 906, or if the window is completely on the screen at block 905, then the algorithm tests whether the window is too big for the sprung open routine (block 907). If the window is too big then it is resized to fit on the monitor that the cursor is currently on, leaving several pixels of free space around the window (block 908).

After block 907, if the window is not too big, or after it is resized in block 908, the algorithm loops to block 909 where the window reference (description of the temporary window) is stored in the Sprung Record. Next, the Sprung Record is pushed onto the Sprung Stack (block 910). After block 910, the algorithm returns to block 703 of FIG. 7.

Figure 10:
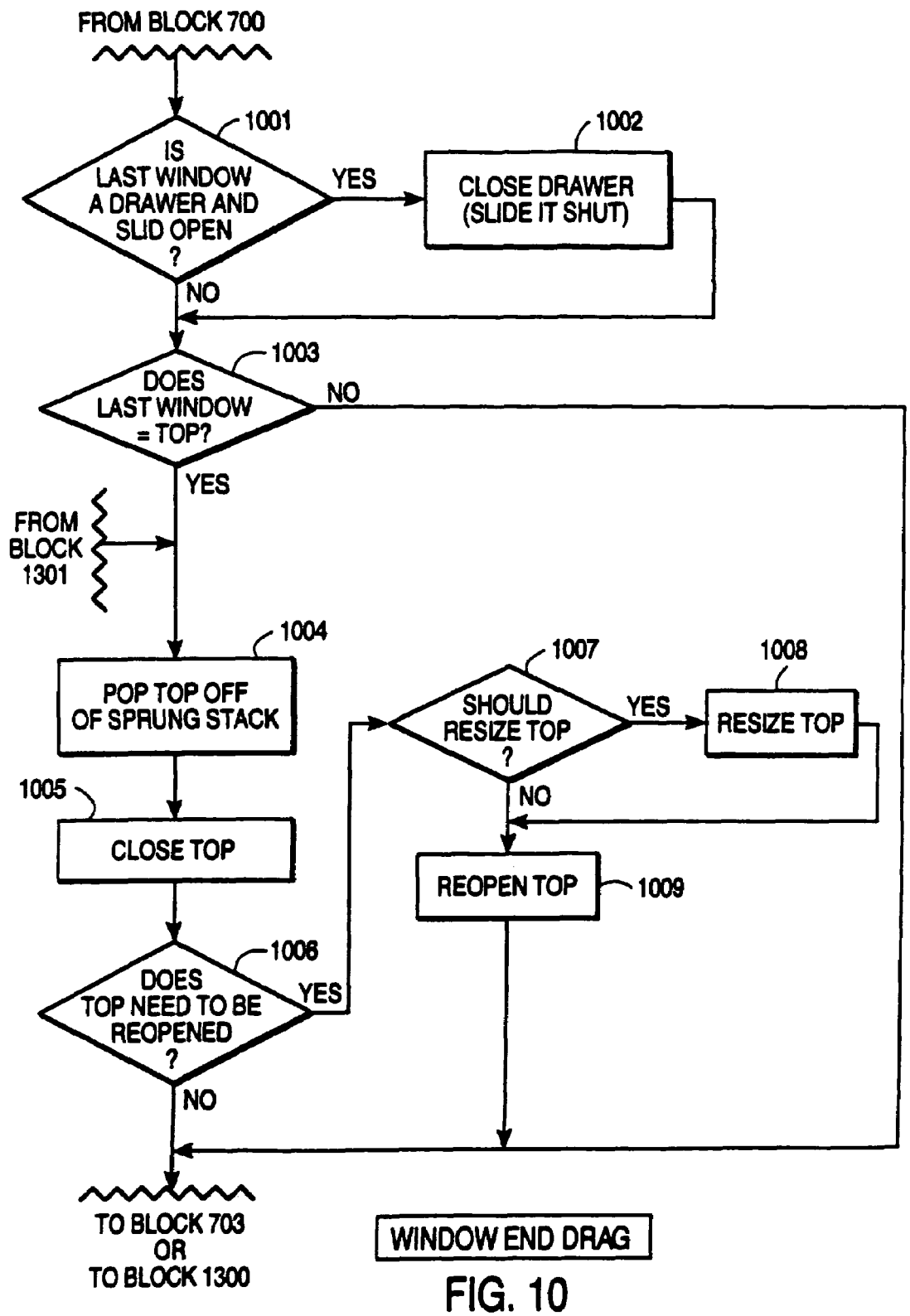

FIG. 10 illustrates the Window End Drag routine represented by block 1001 of FIG. 7. The Window End Drag routine is entered from block 700 of FIG. 7. The first step is to determine whether the Last Window is a slid open drawer in block 1001. If it is a slid open drawer, then the drawer is closed (block 1002).

If the Last Window is not an open drawer, or after the drawer is shut in block 1002, then the algorithm tests whether the Last Window is the Top Window in the Sprung Stack (block 1003). If it is not, then the algorithm returns to block 1003 of FIG. 7 or to block 1300 of FIG. 13.

Figure 13:
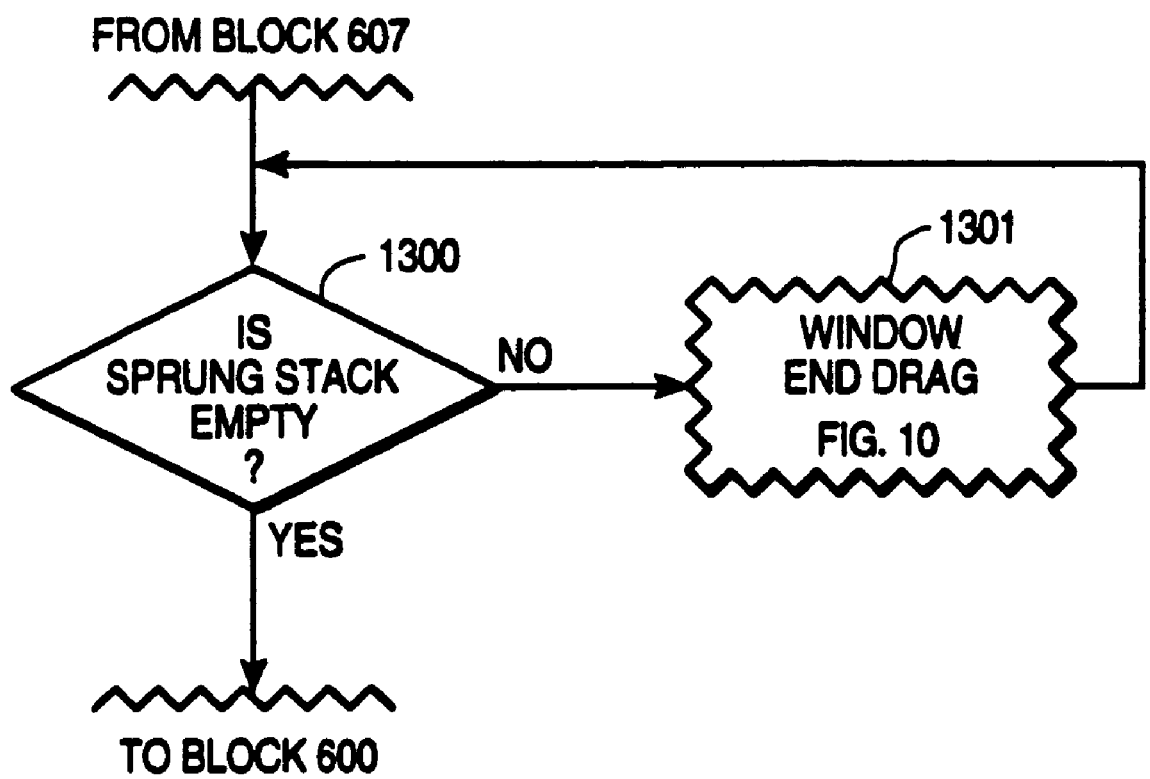

If at block 1003 the Last Window is the Top window in the sprung stack or if the algorithm is entered from block 1301 of FIG. 13, then the Last Window is popped off the Top of the Sprung Stack (block 1004).

After the Sprung Record is popped off of the Top of the Sprung Stack, the temporary window corresponding to the Top record is closed (block 1005). Next, the algorithm determines whether the Top window (being popped off the stack) needs to be re-opened (block 1006). This occurs if the Top was open at another location on the desktop before the temporary window was opened during the drag operation. If so, the Top is re-opened at the location indicated in the Sprung Record, and then the algorithm determines whether it should be resized (block 1007). If it needs to be resized, then the resize operation is executed (block 1008). If the Top that is being popped off the top of the Sprung Stack does not need to be resized, or after the resizing in block 1008, then the new Top of the Sprung Stack is opened (block 1009). After block 1009, or if the window does not need to be re-opened from block 1006, the algorithm returns to block 1003 of FIG. 7 or to block 1300 of FIG. 13.

FIG. 11 illustrates the In Drawer routine corresponding to block 801 of FIG. 8. The In Drawer routine in entered from block 800 of FIG. 8 and first tests whether the cursor is within the Threshold of the drawer management logic (block 1100). If it is not, then the algorithm returns to block 802 of FIG. 8. If it is within the Threshold, then the drawer is slid open one notch (block 1101). After block 1101, the algorithm returns to block 802 of FIG. 8. By keeping the cursor in this position, the user causes the drawer to gradually slide open.

Figure 12:
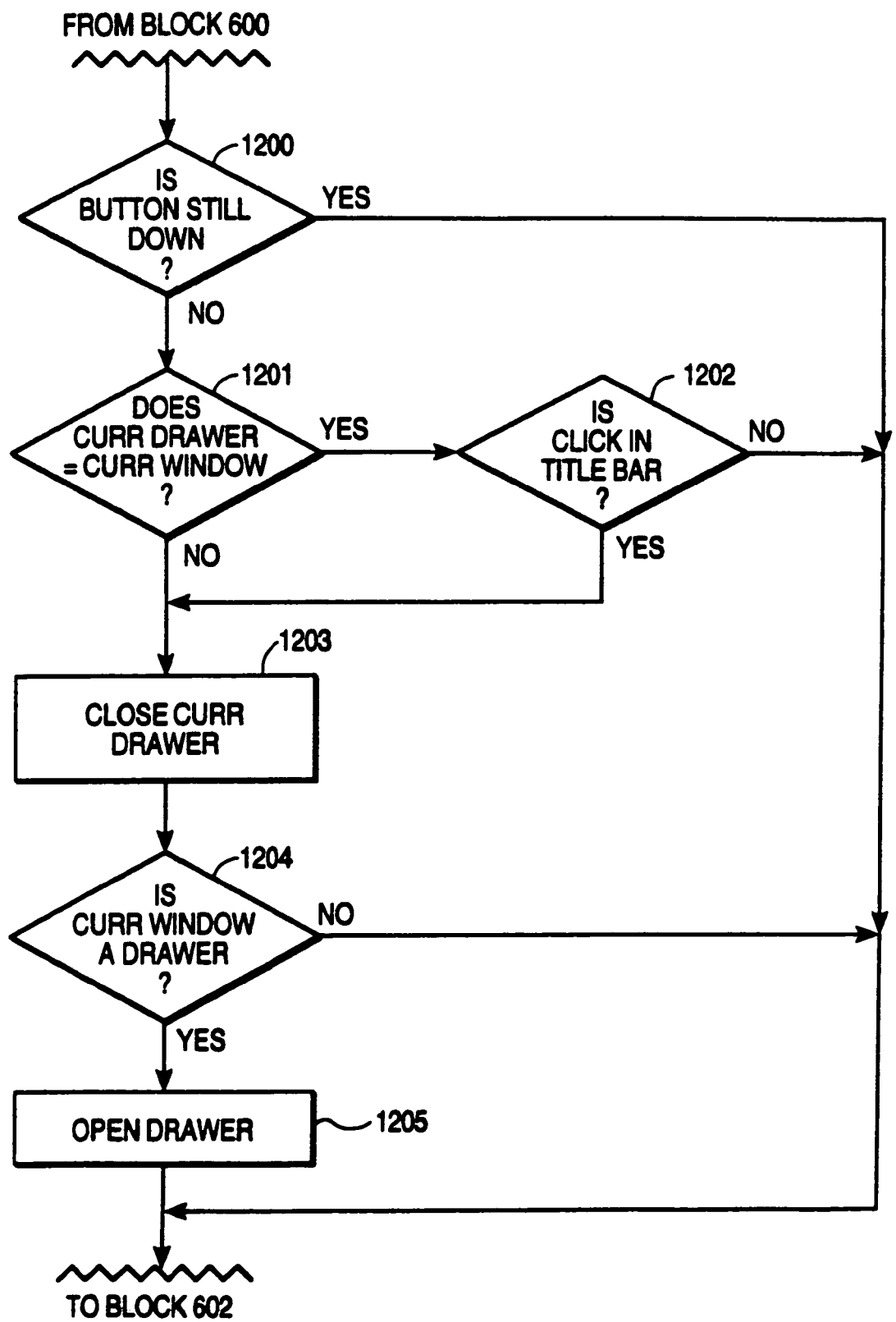

FIG. 12 illustrates the Drawer Stuff routine entered from block 600 of FIG. 6. It first tests whether the button remains down (block 1200). If it is down, then the algorithm returns to block 602 of FIG. 6. If the button has been released, then the algorithm tests whether the Current Drawer is equal to the Current Window (block 1201). If the cursor remains within the Current Window, the algorithm determines whether the click (release detected in block 1200) occurred in the title bar of the opened drawer (block 1202). If not, the algorithm returns to block 602 of FIG. 6. If the click was in the title bar, or if the click was not in the Current Drawer as indicated at block 1201, then the Current Drawer is removed from the screen (block 1203). Next, the algorithm determines whether the Current Window is a drawer at all (block 1204). If not, it returns to block 602. If the Current Window is a drawer, then the drawer is opened (block 1205). This occurs when a drawer is open and another drawer is clicked.

FIG. 13 illustrates the Finish Drag routine corresponding to block 608 of FIG. 6. The Finish Drag routine is entered from block 607 of FIG. 6. The algorithm first determines whether the Sprung Stack is empty in block 1300. If it is not empty, then the Window End Drag routine is executed as indicated at block 1301. The Window End Drag routine of block 1301 enters the routine of FIG. 10 at block 1004. After the Window End Drag routine of block 1301, the algorithm returns to block 1300. If the Sprung Stack was empty at block 1300, then the algorithm returns to block 600 of FIG. 6.

III. Alternate Spring Open Gestures (FIGS. 14A-B and 15A-B)

FIGS. 14A-B and 15A-B illustrate alternative mouse gestures that may be used for springing open enclosures according to the present invention. The preferred system, as illustrated above, springs open enclosures in response to a pause of the cursor over the enclosure to be opened, as described with reference to FIG. 8. Alternative systems may be implemented that spring open enclosures based on other pointer gestures. Two examples are shown in FIGS. 14A-B and FIGS. 15A-B.

Figure 14A:
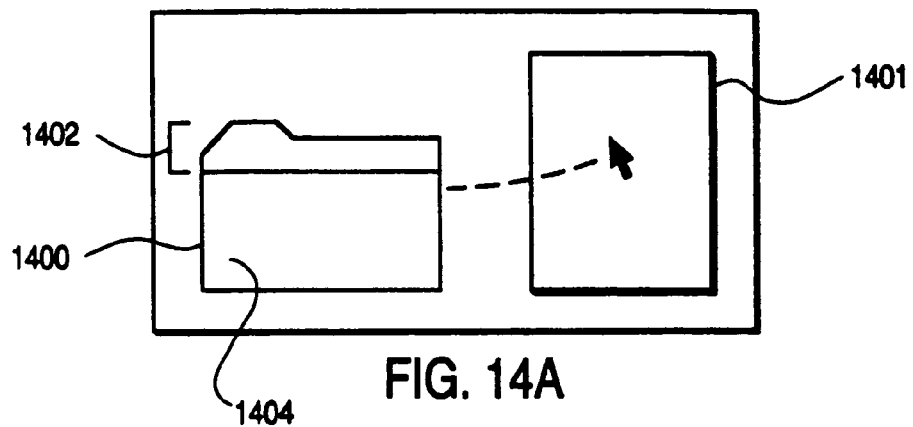
FIGS. 14A and 14B illustrate an alternative technique for indicating a wish to open a spring-loaded enclosure.
Figure 14B:
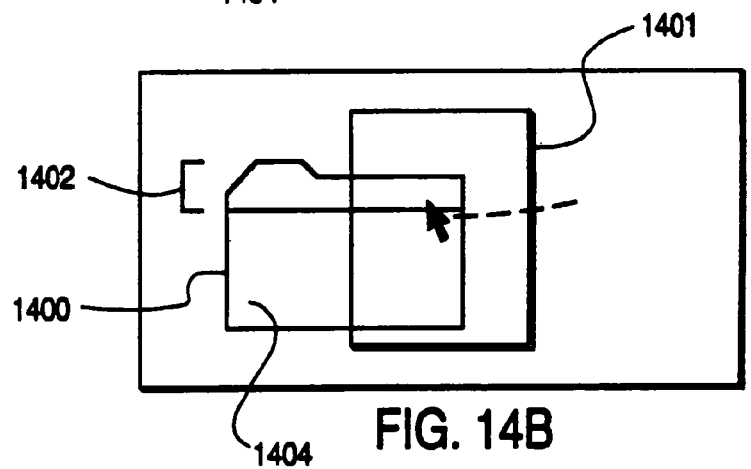

In FIGS. 14A-B, enclosure icon 1400 and a dragged icon 1401 are shown. The enclosure icon 1400 has a hot region, or temporary window open region, 1402 and a main box 1404. If the cursor is moved into the hot region 1402, as illustrated in FIG. 14B, then the sprung open enclosure will be open. If the cursor does not hit the hot region 1402, then no action occurs. If the mouse button is released over the main box 1404, then the dragged object goes inside the enclosure.

Figures 15A, 15B:
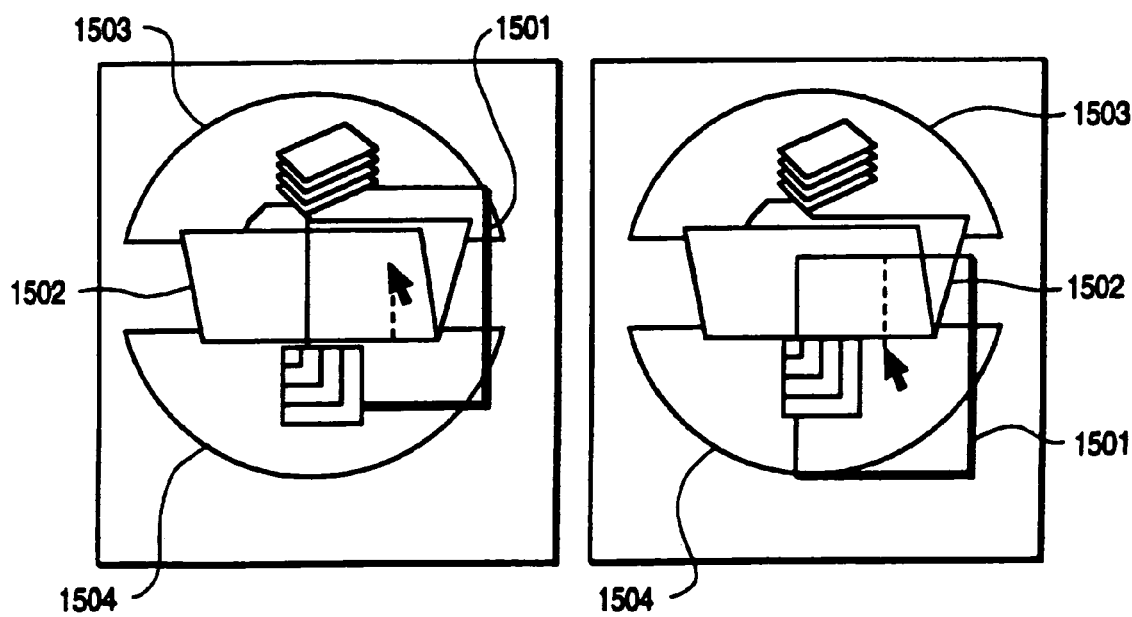
FIGS. 15A and 15B illustrate another alternative technique for indicating a wish to open a spring-loaded enclosure.

In FIGS. 15A and 15B, another alternative sequence is shown. In this sequence, a dragged icon 1501 is dragged over a folder. When this occurs, a select icon appears, such as an opened folder icon 1502 with a split pie symbol. The split pie has a first side 1503 and a second side 1504. If the user moves the cursor downward to the second side 1504, as illustrated in FIG. 15B, then the sprung open enclosure is opened. Alternatively, if the user moves the cursor upward into the first side 1503, then some other action may occur. If user moves the cursor through the split pie, then the select icon is removed and the original icon reappears. As before, if the mouse button is released over the opened folder, then the dragged object goes inside the folder.

Those skilled in the art will appreciate that there are a variety of techniques for indicating the desire to spring open an enclosure during a drag operation.

IV. Conclusion

A new behavior of the graphical user interface has been provided which allows a user to open and close enclosures, such as folders in the Macintosh Finder™ environment, while dragging some other object. When the user pauses, gestures, or rolls over a hot spot on the object during the drag, a temporary window corresponding to that object is opened on top of the cursor. This allows the user to browse inside the enclosure and possibly open a hierarchy of enclosures contained within the newly opened window during the drag operation. The user thus has access to the entire storage system hierarchy during a drag operation. By using the spring loaded enclosure mechanism, the user is left free to browse while dragging, rather than being forced to set up source and destination windows before a drag begins. This greatly improves the basic copy and move functions provided by the graphical user interfaces based on windows and icons.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method, comprising:
performing a drag operation comprising associating an object with a pointer on a display;
storing in a memory a plurality of objects including enclosures that comprise objects that may enclose other objects;
displaying windows on the display corresponding to open enclosures wherein a window for an opened enclosure includes identifiers within the window corresponding to objects enclosed by the opened enclosure; and
opening a temporary window for a particular enclosure displayed within one of the windows to display identifiers within the temporary window corresponding to objects enclosed by the particular enclosure in response to a drag operation of the pointer over an identifier corresponding to the particular enclosure.

2. The method of claim 1 further comprising:
placing a particular object into the particular enclosure in response to a drag operation beginning from a position of a selected identifier corresponding to the particular object to ending at another position within the temporary window.

3. The medium of claim 1 further comprising:
drawing the temporary window on the display over the pointer.

4. The medium of claim 1 further comprising:
drawing the temporary window on the display over the identifier corresponding to the particular enclosure.

5. The method of claim 1 further comprising:
drawing the temporary window on the display centered over the pointer.

6. The method of claim 1 further comprising:
determining whether the display includes an existing window for the particular enclosure; and
removing the existing window for the particular enclosure during the drag operation to open the temporary window.

7. The method of claim 1 further comprising:
determining whether the display includes an existing window for the particular enclosure during the drag operation to open a temporary window; and
drawing the temporary window on the display over the identifier corresponding to the particular enclosure.

8. The method of claim 7 further comprising:
displaying a zoom of the existing window to the temporary window.

9. The method of claim 7 further comprising:
redrawing the existing window on the display in response to a drag of the pointer outside the temporary window during a drag operation.

10. The method of claim 1 further comprising:
opening the temporary window in response to additional user input during a drag operation of the pointer over an identifier corresponding to the particular enclosure.

11. The method of claim 1 further comprising:
opening additional temporary windows as current temporary windows in response to a drag during the drag operation of the pointer over an identifier within the current temporary windows.

12. The method of claim 11 further comprising:
closing a particular temporary window opened during the drag operation in response to movement of the pointer out of the particular temporary window.

13. The method of claim 12 further comprising:
closing the particular temporary window opened during the drag operation in response to movement of the pointer out of the particular temporary window to another window.

14. The method of claim 11 further comprising:
closing a particular temporary window opened during the drag operation in response to movement of the pointer out of the particular temporary window, except for particular temporary windows selected by user input before movement of the pointer out of the temporary windows.

15. A method comprising:
associating an object with a pointer on a display in response to a drag operation;
storing in a memory a plurality of objects including enclosures that comprise objects that may enclose other objects;
in response to a drag operation, displaying windows on the display corresponding to open enclosures wherein a window for an opened enclosure includes identifiers within the window corresponding to objects enclosed by the opened enclosure;
opening a temporary window for a particular enclosure to display identifiers within the temporary window corresponding to objects enclosed by the particular enclosure;
determining whether the display includes an existing window; and
removing the existing window for the particular enclosure during the drag operation to open the temporary window.

16. The method of claim 15 further comprising:
drawing the temporary window on the display over the identifier corresponding to the particular enclosure.

17. A computing system comprising:
a display;
a processing unit coupled to memory, said memory storing program code which when processed by said processing unit causes said processing unit to perform the following method:
performing a drag operation comprising associating an object with a pointer on said display;
storing in said memory a plurality of objects including enclosures that comprise objects that may enclose other objects;
displaying windows on the display corresponding to open enclosures wherein a window for an opened enclosure includes identifiers within the window corresponding to objects enclosed by the opened enclosure; and
opening a temporary window for a particular enclosure displayed within one of the windows to display identifiers within the temporary window corresponding to objects enclosed by the particular enclosure in response to a drag operation of the pointer over an identifier corresponding to the particular enclosure.

18. The computing system of claim 17 wherein said method further comprises:
placing a particular object into the particular enclosure in response to a drag operation beginning from a position of a selected identifier corresponding to the particular object to ending at another position within the temporary window.

19. The computing system of claim 17 wherein said method further comprises:
drawing the temporary window on the display over the pointer.

20. The computing system of claim 17 wherein said method further comprises:
drawing the temporary window on the display over the identifier corresponding to the particular enclosure.

21. The computing system of claim 17 wherein said method further comprises:
drawing the temporary window on the display centered over the pointer.

22. The computing system of claim 17 wherein said method further comprises:
determining whether the display includes an existing window for the particular enclosure; and
removing the existing window for the particular enclosure during the drag operation to open the temporary window.

23. The computing system of claim 17 wherein said method further comprises:
determining whether the display includes an existing window for the particular enclosure during the drag operation to open a temporary window; and
drawing the temporary window on the display over the identifier corresponding to the particular enclosure.

24. The computing system of claim 23 wherein said method further comprises:
displaying a zoom of the existing window to the temporary window.

25. The computing system of claim 23 wherein said method further comprises:
redrawing the existing window on the display in response to a drag of the pointer outside the temporary window during a drag operation.

26. The computing system of claim 23 wherein said method further comprises:
opening the temporary window in response to additional user input during a drag operation of the pointer over an identifier corresponding to the particular enclosure.

27. The computing system of claim 17 wherein said method further comprises:
opening additional temporary windows as current temporary windows in response to a drag during the drag operation of the pointer over an identifier within the current temporary windows.

28. The computing system of claim 27 wherein said method further comprises:
closing a particular temporary window opened during the drag operation in response to movement of the pointer out of the particular temporary window.

29. The computing system of claim 28 wherein said method further comprises:
closing the particular temporary window opened during the drag operation in response to movement of the pointer out of the particular temporary window to another window.

30. The computing system of claim 27 wherein said method further comprises:
closing a particular temporary window opened during the drag operation in response to movement of the pointer out of the particular temporary window, except for particular temporary windows selected by user input before movement of the pointer out of the temporary windows.

31. A computing system, comprising:

a display;

a processing unit coupled to memory, said memory storing program code which when processed by said processing unit causes said processing unit to perform the following method:

associating an object with a pointer on said display in response to a drag operation;

storing in said memory a plurality of objects including enclosures that comprise objects that may enclose other objects;

in response to a drag operation, displaying windows on the display corresponding to open enclosures wherein a window for an opened enclosure includes identifiers within the window corresponding to objects enclosed by the opened enclosure;

opening a temporary window for a particular enclosure to display identifiers within the temporary window corresponding to objects enclosed by the particular enclosure;

determining whether the display includes an existing window; and removing the existing window for the particular enclosure during the drag operation to open the temporary window.

32. The computing system of claim 31 wherein said method further comprises:

drawing the temporary window on the display over the identifier corresponding to the particular enclosure.

33. A computing system, comprising:

a display and a pointing device with which a user drags a pointer on said display;

a processing unit coupled to memory, said memory storing program code which when processed by said processing unit causes said processing unit to perform a method for finding objects in said computing system, comprising:

performing a drag operation, the drag operation comprising associating an object with the pointer;

storing in said memory a plurality of objects including enclosures, wherein enclosures comprise objects which may enclose other objects;

displaying windows on the display corresponding to open enclosures, wherein a window for an opened enclosure includes identifiers within the window corresponding to objects enclosed by the opened enclosure;

displaying an identifier corresponding to a particular enclosure within one of the windows; and opening a temporary window for the particular enclosure to display identifiers within the temporary window corresponding to objects enclosed by the particular enclosure, in response to a drag during the drag operation of the pointer over an identifier corresponding to the particular enclosure.

34. The computing system of claim 33 wherein said method further includes the step of closing the temporary window, in response to a drag during the drag operation of the pointer outside the temporary window.

35. A machine readable storage medium containing program code which when processed by a processing unit causes said processing unit to perform a method for finding objects in a computing system having a display and a pointing device with which a user drags a pointer on said display, said method comprising:

performing a drag operation, the drag operation comprising associating an object with the pointer;

storing in a memory a plurality of objects including enclosures, wherein enclosures comprise objects which may enclose other objects;

displaying windows on the display corresponding to open enclosures, wherein a window for an opened enclosure includes identifiers within the window corresponding to objects enclosed by the opened enclosure;

displaying an identifier corresponding to a particular enclosure within one of the windows; and opening a temporary window for the particular enclosure to display identifiers within the temporary window corresponding to objects enclosed by the particular enclosure, in response to a drag during the drag operation of the pointer over an identifier corresponding to the particular enclosure.

36. The machine readable medium of claim 33 wherein said method further includes the step of closing the temporary window, in response to a drag during the drag operation of the pointer outside the temporary window.

* * * * *